(12) United States Patent
Palmin

(10) Patent No.: US 12,158,936 B2
(45) Date of Patent: Dec. 3, 2024

(54) CONTROL SYSTEM FOR A TECHNICAL INSTALLATION AND METHOD FOR REMOVING ONE OR MORE CERTIFICATES

(71) Applicant: Siemens Aktiengesellschaft, Munich (DE)

(72) Inventor: Anna Palmin, Karlsruhe (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 187 days.

(21) Appl. No.: 17/974,995

(22) Filed: Oct. 27, 2022

(65) Prior Publication Data

US 2023/0267188 A1    Aug. 24, 2023

(30) Foreign Application Priority Data

Oct. 29, 2021  (EP) .................................. 21205657

(51) Int. Cl.
  *G06F 21/33*  (2013.01)
  *G06F 21/55*  (2013.01)
(52) U.S. Cl.
  CPC ............ *G06F 21/33* (2013.01); *G06F 21/554* (2013.01)
(58) Field of Classification Search
  CPC ................................ G06F 21/33; G06F 21/554
  See application file for complete search history.

(56) References Cited

U.S. PATENT DOCUMENTS

| | | | |
|---|---|---|---|
| 5,745,574 A | 4/1998 | Muftic | |
| 9,754,100 B1* | 9/2017 | Hitchcock | H04L 9/0891 |
| 2006/0117382 A1* | 6/2006 | Karabulut | H04L 9/3265 726/10 |
| 2010/0257358 A1 | 10/2010 | Grajek et al. | |
| 2011/0154027 A1* | 6/2011 | Liu | H04L 9/3263 713/158 |
| 2011/0219227 A1 | 9/2011 | Sharif et al. | |
| 2017/0366537 A1 | 12/2017 | Bose et al. | |
| 2019/0379549 A1 | 12/2019 | Sundar et al. | |
| 2022/0116229 A1* | 4/2022 | Jones | H04L 9/3265 |

FOREIGN PATENT DOCUMENTS

EP    3258662    12/2017
WO   2011112466   9/2011

* cited by examiner

*Primary Examiner* — Thaddeus J Plecha
(74) *Attorney, Agent, or Firm* — Cozen O'Connor

(57) ABSTRACT

A control system for a technical installation, in particular a process or manufacturing installation, includes at least one component upon which a certificate service is computer implemented, wherein the certificate service is configured to check a certificate store that is assigned to the component or a further component to determine whether two or more certificates, which only differ from one another in terms of their validity period, are stored in the certificate store, and in the event of the check identifying two or more certificates of this type, to initiate revocation and removal from the certificate store of the certificate or certificates with the validity period that ends the earliest, such that only the certificate with the validity period that ends the latest remains stored in the certificate store.

22 Claims, 2 Drawing Sheets

CONTROL SYSTEM FOR A TECHNICAL INSTALLATION AND METHOD FOR REMOVING ONE OR MORE CERTIFICATES

BACKGROUND OF THE INVENTION

1. Field of the Invention

The invention relates to a control system for a technical installation, in particular a process or manufacturing installation, a method for removing one or more certificates and also relates to use of the control system for operating the technical installation.

2. Description of the Related Art

As a result of the increasing need for protection (due to the increasing use of open IT standards and protocols) and the requirements of International Electrotechnical Commission (IEC) standard 62443 as the leading industrial security standard, communication links in control systems of technical installations have to be increasingly safeguarded, i.e., adequately protected against unauthorized access.

Depending upon the results of a "threat and risk analysis" (TRA), adequate protection can particularly comprise encryption and/or authentication of the transmitted data. Corresponding encryption and authentication mechanisms are usually a component of secure communication protocols (such as Transport Layer Security (TLS), Open Platform Communications United Architecture (OPC UA)). The use of secure communication protocols requires the communication participants to have digital certificates.

The certificates used in an operational environment (such as an industrial installation) in order, for example, to enable secure communication or user authentication are usually referred to as "operational certificates" (OC). For security reasons, it is recommended that a dedicated operational certificate is used for each communication protocol used. This means that if, for example, an installation component uses OPC UA to safeguard one communication relationship and TLS to safeguard another communication relationship, then the component requires both an OPC UA certificate and a TLS certificate (for the TLS server or the TLS client authentication). If the number of installation components, and hence the number of operational certificates, is low, then the certificates can be imported manually into the installation components.

In the case of increasing numbers of installation components that are involved in secure communication relationships and that require a variety of certificates, it makes sense to automate the issue of operational certificates (based on certificate requests (CR) generated by the installation components) and the allocation of the certificates issued to the components. Such automated certificate management usually requires a "public key infrastructure" (PKI) to be provided in the respective operational environment (for example, an industrial installation).

In order to enable the installation components to "understand" the components of the public key infrastructure as optimally as possible, it is increasingly common for certificate management protocols, such as the "Certificate Management Protocol (CMP)" according to RFC 4210 or the "Lightweight CMP Profile", to be implemented in these components. The use of such protocols enables a distinction to be made between various scenarios (such as an initial request for an operational certificate for a specific purpose or a request for the renewal of an operational certificate that already exists for a specific purpose). In addition, such protocols are suitable for requesting different types of certificates because, in most cases, it is advisable, before requesting application-specific operational certificates, to equip the installation components with the installation-specific customer certificates (customer device certificate, (CDC)) that bind the components to the customer installation (as an employee ID card binds employees to a company) and then to use these as the basis for requesting an operational certificate.

According to current specifications/recommendations (for example from National Institute of Standards and Technology (NIST)), certificates or the associated private keys should be renewed regularly (for example, every two years). In the context of automated certificate management, this means that the installation components request renewal (for example, via a central registration authority (RA)) from a certification authority (CA) that issued the certificates that are to be renewed, for example, by submitting certificate requests thereto. To accomplish this, the installation components should be able to check whether the current time lies between the "Valid from" and "Valid to" times shown in the certificate.

Due to the risk of possible connectivity problems and timeouts, the renewal of a certificate is usually requested in advance (for example, a few weeks before the expiry of the certificate) or performed manually by a user (via an administrative user interface). The result of the certificate renewal is represented by a certificate, which usually differs from the original certificate because it has a different public key and/or a different validity period. The essential contents of the certificate (in particular the values of the certificate attributes "Applicant", "Issuer", "Serial number", "Key usage", "Extended key usage") remain unchanged.

The certificate is usually stored in the certificate store of the respective installation component, normally in the "Own" subdirectory. Hence, after successful renewal, there are at least two (almost) identical and overlapping valid certificates that can be used for the same purpose in the "Own" directory. If the certificate renewal is repeatedly initiated by a user for test purposes or if an installation component has not received a requested certificate within a preconfigured period of time due to a technical problem (for example, a connection problem) and has hence repeatedly requested renewal (several times, if necessary), then it is even possible for multiple identical overlapping valid certificates that only differ from one another by different validity periods and different public keys to be stored in "Own".

As explained below, this can have a detrimental effect: if an installation component searches for a certificate for a specific purpose in its certificate store (in "Own"), for example, using "Key usage" or "Extended key usage", in order, for example, to sign a data packet that it is to transmit to another installation component or to authenticate itself to another installation component, then it will find more than only one certificate matching this dedicated purpose. Searching for this certificate may take a long time and impair the performance of the component of the installation. In addition, this unnecessarily overloads the certificate store of the installation components. In this regard, it should be borne in mind that most industrial IoT devices (for example, industrial edge devices) have very limited storage space. For this reason, in particular only the necessary certificates should be stored in the certificate store of such devices.

Moreover, it is frequently incorrectly assumed that the process for renewing a certificate also includes or entails the revocation of the existing certificate by default. However, this is not usually the case. For example, according to the Certificate Management Protocol (CMP) as per RFC 4210, two different types of message or request (Key Update Request (KUR), or Revocation Request (RR)) are defined for requesting certificate renewal or certificate revocation together with the associated response types (Key Update Response (KUP), or Revocation Response, (RP)), which are not directly related to one another. Neither is any revocation request explicitly provided in the context of certificate management using the so-called OPC UA Global Discovery Server (GDS) in accordance with to the OPC UA specification.

If the process for renewing a certificate were to include immediate revocation of the existing certificate by default, then this would have the effect that the existing certificate for which an installation component has requested renewal would be revoked by the responsible issuing certification authority (issuing CA) immediately after a "successor" has been issued, i.e., it would be placed on the certificate revocation list (CRL) of the issuing CA. Hence, if the "successor" is only delivered to the relevant installation component, usually via a registration authority (RA), with a delay (as is often the case in the industrial environment), it is possible that the existing certificate stored in the certificate store of the relevant installation component is already invalid (because it is listed on the CRL of the issuing CA), but it does not yet have a newer certificate.

Hence, the component would "unknowingly" use the revoked, and hence no longer valid, certificate during secure communication and this would be "noticed" by its communication partner during revocation status checking. As a result, the communication partner would refuse the communication process and this could lead to communication interruptions and hence jeopardize normal operation and availability of the industrial installations.

EP 3 258 662 A1 discloses a method for registering an intelligent electrical device with a certification authority.

U.S. Pat. No. 5,745,574 A discloses a security infrastructure with a plurality of certification authorities.

SUMMARY OF THE INVENTION

It is an object of the invention to provide a control system for a technical installation that enables improved certificate management for components of a technical installation.

This object is achieved by a control system for a technical installation, in particular a process or manufacturing installation, a method for removing one or more certificates from a certificate store of a component of a control system for a technical installation, in particular a manufacturing or process installation, and use of a control system.

In accordance with the invention the control system for the technical installation has at least one component upon which a certificate service is computer-implemented, where the certificate service is configured to check a certificate store that is assigned to the component or a further component in order to determine whether two or more certificates, which only differ from one another in terms of their validity period, are stored in the certificate store; and, in the event of the check identifying two or more certificates of this kind, to initiate the revocation and removal of the certificate or certificates from the certificate store with the validity period that ends the earliest, so that only the certificate with the validity period that ends the latest remains stored in the certificate store.

The technical installation can be an installation from process industries such as a chemical, pharmaceutical, petrochemical installation or an installation from the food and beverage industry. This also includes any installations from the production industry, factories in which, for example, cars or goods of any kind are produced. Technical installations suitable for performing the method in accordance with the invention can also come from the field of energy production. Wind turbines, solar parks or power plants for energy production are also covered by the term technical installation.

In the present context, a control system should be understood to mean a computer-aided technical system that comprises functionalities for displaying, operating and controlling a technical manufacturing or production installation. The control system can also comprise sensors for determining measured values and various actuators. Moreover, the control system can comprise process-oriented or manufacturing-oriented components that are used to actuate the actuators or sensors. In addition, the control system can, inter alia, have means for visualizing the technical installation and for engineering. The term control system additionally also includes further computing units for more complex regulation systems and systems for data storage and data processing.

A certificate should be understood to mean a digital data set that confirms certain properties (in this case of machines, devices, applications and the like). The authenticity and integrity of the certificate can usually be verified by means of cryptographic methods.

In principle, the certificate service can be implemented on any component of the control system configured for this purpose. It is configured to monitor not only the certificate store of the component on which it is implemented, but rather any component of the control system (as long as it is assigned to a certificate store). The certificate store can be implemented directly on the respective component or the respective component is assigned to a certificate store located on a further component.

The certificate service can consist of a plurality of subservices, which can be implemented on a single component or also on components of the control system that differ from one another. For example, a first subservice of the certificate service can fulfill the function of checking the certificate store, while a second subservice initiates the revocation of the relevant certificates and a third subservice initiates the removal of the certificates.

The control system in accordance with the invention particularly advantageously ensures that exactly one single dedicated certificate for a specific purpose exists in the certificate store of an installation component at any given time. This eliminates the need to search for the "most suitable" certificate from a large number of identical certificates when necessary. This also means no time has to be expended on the search. In addition, this helps to ensure that optimum use is made of the certificate store of the installation components and that it is not overloaded.

The certificate service can be configured to store the certificate or certificates that are revoked and removed from the certificate store in an archive of the control system and/or a cloud-based environment in order to enable traceability of certificate revocations. Particularly in the context of an audit trail, it is of interest to know which certificates have been removed from the certificate store. Herein, it is advantageously additionally possible to store information regarding: the reason why, the time at which, the service via which, or from which certificate store of which component the relevant certificate was removed.

In the context of an advantageous embodiment of the invention, the certificate service is configured only to initiate the removal of a certificate when it has received confirmation of the revocation of the certificate. This ensures that removal of the certificate only occurs when this certificate has been proven to be invalid, i.e., has been revoked. Herein, the confirmation of the revocation of the certificate can represent an explicit revocation message from a certification authority responsible for the revocation. Herein, the revocation message is sent directly from the certification authority to the certificate service that requested the revocation. Alternatively or additionally, the confirmation of the revocation of the certificate can represent a revocation list issued by a certification authority responsible for revocation after the revocation of the certificate and which lists the revoked certificate and further certificates revoked by the certification authority. Herein, the certificate service is notified of the revocation of the certificate not directly, but indirectly via the distribution of the revocation list. This can be made available in that the revocation list is distributed in an adequate manner either directly to the components of the control system or to a location that the components access regularly for the purpose of obtaining/uploading the updated revocation list (such as a revocation list distribution point, a PKI proxy, an LRA or an RA).

The certification service is preferably configured to initiate the revocation of one or more certificates by directly submitting a revocation request to a certification authority responsible for the revocation of certificates. Herein, the certification service undertakes the revocation request in an automated manner, i.e., independently of any external query. However, it can also be configured to initiate the revocation of one or more certificates by a corresponding prompt to an operator of the control system. This prompt to the operator to confirm the revocation entails an additional intermediate step that can ensure that revocation of the certificate is also actually to take place. This is an additional control instance that may be required in certain circumstances (high security relevance).

The component or components on which the certificate service or the subservices of the certificate service are implemented can, for example, represent an engineering station server, an automation device, a field device, a programmable logic controller, a switch, a machine tool, an edge component, an operator station server or an operator station client.

In the present case, an "engineering station server" should be understood to be a server embodied to create, manage, archive and document various hardware and software projects for a control system of a technical installation. Special software design tools (engineering toolset) and preassembled modules and plans enable the engineering station server to plan and manage the interaction between control devices and facilities of the technical installation. One example of this is a SIMATIC Manager Server from SIEMENS.

In the present case, an "operator station server" should be understood to be a server that centrally acquires data from an operating and observation system and, as a rule, alarm and measured value archives from a control system of a technical installation and makes them available to users. The operator station server usually establishes a communication link to automation systems of the technical installation and forwards data from the technical installation to "clients" to be used to operate and observe the operation of the individual functional elements of the technical installation. The operator station server can have client functions in order to access the data (archives, messages, tags, variables) of other operator station servers.

This enables images of the operation of the technical installation on the operator station server to be combined with variables of other operator station servers (server-server communication). The operator station server can be, but is not limited to, a SIMATIC PCS 7 Industrial Workstation server from SIEMENS.

Automation devices are used to implement automation and can, for example, be programmable logic controllers that provide a higher-level control function for subordinate programmable logic controllers.

In the event of the check identifying two or more certificates of this kind, or in the case of the existence of the explicit revocation message from the certification authority responsible for the revocation, or the existence of the revocation list issued after the revocation of the certificate, or in the case of the revocation of the certificate, the certification service can be configured to classify this event as a security event and to store a corresponding message in an archive of the control system and/or a cloud-based environment. Herein, the archive or the cloud-based environment can, for example, be a Security Information and Event Management System (SIEM) system in which all security-relevant information/data relating to the technical installation is stored.

It is also a further object of the invention to provide a method for removing one or more certificates from a certificate store of a component of a control system for a technical installation, in particular a manufacturing or process installation, where the method comprises a) checking, via a computer-implemented certificate service on the component or on a further component of the control system, whether two or more certificates, which only differ from one another in terms of their validity period, are stored in the certificate store, and b) in the event of the check identifying two or more certificates of this kind, initiating by the certificate service of the revocation and removing the certificate or certificates from the certificate store with the validity period that ends the earliest, so that only the certificate with the validity period that ends the latest remains stored in the certificate store.

The certification service can initiate the revocation of one or more certificates by directly submitting a revocation request to a certification authority responsible for the revocation of certificates.

The certificate service can only initiate the removal of a certificate when it has received confirmation of the revocation of the certificate.

Confirmation of the revocation of the certificate can represent an explicit revocation message from a certification authority responsible for the revocation of the certificate or a revocation list that is issued by a certification authority responsible for revocation after the revocation of the certificate and that lists the revoked certificate and further certificates revoked by the certification authority.

The certification service can initiate the revocation of one or more certificates by directly submitting a revocation request to a certification authority responsible for the revocation of certificates or by a corresponding prompt to an operator of the control system.

It is a still further object of the invention to provide a way to use a control system, as explained above, for operating a technical installation, in particular a manufacturing or process installation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will become clearer and more plainly comprehensible in conjunction with the following description of the exemplary embodiments explained in more detail in conjunction with the drawings, in which.

DETAILED DESCRIPTION OF THE EXEMPLARY EMBODIMENTS

Figure 1:
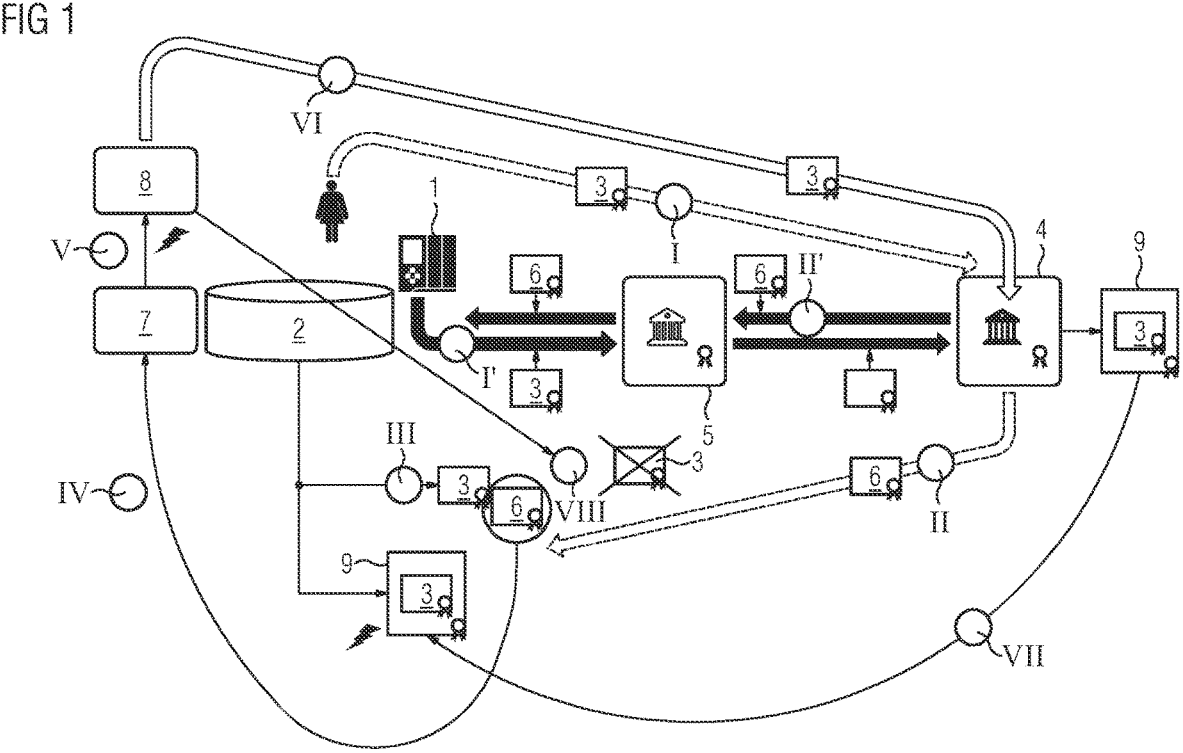
FIG. 1 is a schematic illustration of first aspect of the method in accordance with the invention.

FIG. 1 is a schematic depiction of first aspect of the method in accordance with the invention. Here, a component 1, which is part of a control system for a technical installation and, for example, represents a control device (controller), a switch, an operator station client or an edge device, has a certificate store 2. A first certificate 3 is stored in this store. This first certificate 3 can, for example, be a Transport Layer Security (TLS) server/client certificate or an Open Platform Communications United Architecture (OPC UA) server/client certificate.

In a first step I, an operator of the technical installation requests renewal of the first certificate 3. The request for the renewal of the first certificate 3 can also be issued automatically by the component 1 itself (step I'). The renewal requests can be made directly to a certification authority 4 which is responsible for issuing and revoking certificates in the technical installation. In FIG. 1, the operator sends the request directly to the certification authority 4. The component 1 sends its request to a registration authority 5, which forwards the renewal request (after verifying the identity of the component 1, which will not be discussed further here) to the certification authority 4.

After checking the certificate renewal request, the certification authority 4 transmits a new second certificate 6 to the component 1. This occurs either manually via the operator (step II) or automatically via the registration authority 5 (step II'). The second certificate 6 is stored in the certificate store 2 of the component 1 (step III). The first certificate 3 and the second certificate are issued for the same component 1 for the same purpose and only differ in their validity period. Accordingly, after step III, there are two certificates 3, 6 in the certificate store 2, which only differ from one another in terms of their validity period.

The control system of the technical installation comprises a computer-implemented certificate service 7 (i.e., a "certificate overlap watchdog"), which checks the certificate store 2 in order to determine whether two or more certificates 3, 6, which only differ from one another in terms of their validity period, are present in the certificate store 2 (step IV). In the present exemplary embodiment, two such certificates 3, 6 are present. The certificate service 7 then immediately generates a message, in particular a security event message, (for example, "certificate overlap detected") (step V).

The certificate service 7 has a subservice 8 that initiates revocation of the first certificate 2 in response to the generation of the message (step VI). This can occur via an automatic direct submission of a revocation request for the first certificate 2 to the certification authority 4. This revocation request can be configured in accordance with the "Internet X.509 Public Key Infrastructure Certificate Management Protocol (CMP)". Alternatively, a prompt to the operator of the control system can also be generated and presented visually to the operator, for example, via an operator station client. Following this, the operator can then manually initiate the revocation of the first certificate 2.

The subservice 8 of the certificate service 7 generates a message, in particular a security event message, (for example, "revocation_completed") as soon as the revocation of the first certificate 3 has been proven to have been completed (step VII). This proof is either provided directly by the certification authority 4 via a response to the revocation request (i.e., a "revocation response"), or, alternatively, the certificate service 7 receives the proof indirectly via an updated revocation list 9, which the certification authority 4 generates, distributes in the control system and, inter alia, stores in the certificate store 2 of the component 1. The first certificate 3 is listed as a revoked certificate on this revocation list 9.

The subservice 8 of the certificate service 7 then removes the first certificate 3 from the certificate store 2 of the component 1 (step VIII). After the removal, the first certificate 3 is archived in an archive of the control system or in a cloud-based environment in order to be available for a subsequent audit trail.

Figure 2:
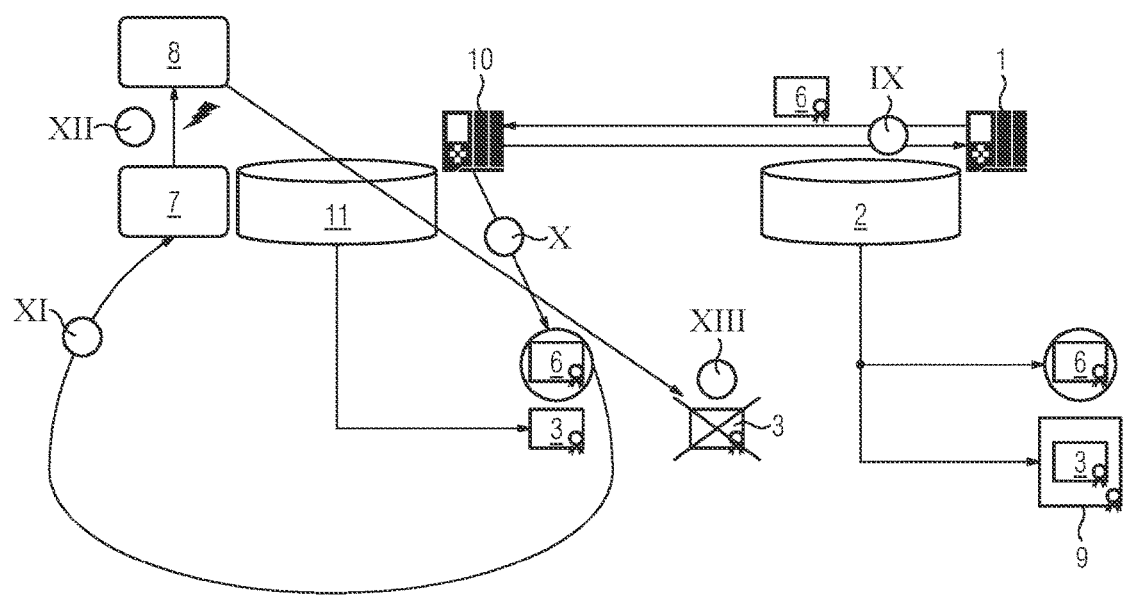
FIG. 2 a schematic illustration a second aspect of the method in accordance with the invention.

FIG. 2 shows a more advanced use of the control system in accordance with the invention or of the certificate service 7 encompassed thereby. The certificate store 2 of the component 1 contains, inter alia, the second certificate 6 and the updated revocation list 9.

The component 1 establishes a communication link to a further component 10 of the control system (step IX). Herein, the component 1 uses its new, second certificate 6 to establish a secure communication link (for example, in the context of a handshake). In accordance with current security concepts, the second certificate 6 is stored in a certificate store 11 of the further component 10 (step X). This certificate store 11 still contains the old first certificate 3, which the further component 10 had received in the context of the establishment of a previous communication.

The certificate service 7 also monitors the certificate store 11 of the further component 10 and identifies the two duplicate certificates 3, 6 that only differ in terms of their validity periods (step XI). Similarly to the method described in FIG. 1, the certificate service 7 generates a message, in particular a security event message (step XII), which then removes the superfluous first certificate 3 from the certificate store 11 of the further component 10 (and archives this removed certificate in an archive/cloud-based environment).

Although the invention has been illustrated and described in greater detail by the preferred exemplary embodiment, the invention is not restricted by the disclosed examples and other variations can be derived herefrom by the person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system for a technical installation, comprising:
   at least one programmable logic controller;
   an automation device; and
   at least one component upon which a certificate service is computer-implemented, the certificate service being configured to:
      check a certificate store which is assigned to the at least one component or a further component to determine whether a plurality of certificates, which only differ from one another in terms of a validity period of the plurality of certificates, are stored in the certificate store; and
      in an event of the check identifying at least two certificates of this kind of the plurality of certificates, initiate revocation and removal of a certificate or the at least two certificates from the certificate store with the validity period that ends the earliest, such that only a certificate with the validity period that ends the latest remains stored in the certificate store.

2. The control system as claimed in claim 1, wherein the certificate service is configured to store the certificate or the at least two certificates which are revoked and removed from the certificate store in at least one of (i) an archive of the control system and (ii) a cloud-based environment to enable traceability of certificate revocations.

3. The control system as claimed in claim 1, wherein the certificate service is configured only to initiate the removal of a certificate upon receiving confirmation of the revocation of the certificate.

4. The control system as claimed in claim 3, wherein the confirmation of the revocation of the certificate represents an explicit revocation message from a certification authority responsible for the revocation.

5. The control system as claimed in claim 3, wherein the confirmation of the revocation of the certificate represents a revocation list issued by a certification authority responsible for revocation after the revocation of the certificate and which lists the revoked certificate and further certificates revoked by the certification authority.

6. The control system as claimed in claim 4, wherein the confirmation of the revocation of the certificate represents a revocation list issued by a certification authority responsible for revocation after the revocation of the certificate and which lists the revoked certificate and further certificates revoked by the certification authority.

7. The control system as claimed in claim 1, wherein the certificate service is configured to initiate the revocation of at least one certificate by directly submitting a revocation request to a certification authority responsible for the revocation of certificates.

8. The control system as claimed in claim 1, wherein the certificate service is configured to initiate the revocation of at least one certificate by a corresponding prompt to an operator of the control system.

9. The control system as claimed in claim 1, wherein the component comprises one of a field device, a further programmable logic controller, a switch, a machine tool, an edge component, an operator station server and an operator station client.

10. The control system as claimed in claim 4, wherein, in the event of the check identifying at least two certificates of this kind, or when the explicit revocation message from the certification authority responsible for the revocation exists, or the existence of a revocation list issued after the revocation of the certificate, or when the certificate is revoked, the certificate service is configured to classify said event as a security event and to store a corresponding message in at least one of (i) an archive of the control system and (ii) a cloud-based environment.

11. The control system as claimed in claim 1, wherein the technical installation comprises a process or manufacturing installation.

12. The control system as claimed in claim 1, wherein the control system operates a technical installation comprising a process or manufacturing installation.

13. A method for removing at least one certificate from a certificate store of a component of a control system for a technical installation, the method comprising:
   a) checking, via a computer-implemented certificate service on the component or on a further component of the control system whether a plurality of certificates, which only differ from one another in terms of their validity period, are stored in the certificate store; and
   b) in an event of the check identifying at least two certificates of this kind of the plurality of certificates, initiating by the certificate service revocation and removal of the at least one certificate or the at least two certificates from the certificate store with a validity period which ends the earliest, such that only the certificate with a validity period that ends the latest remains stored in the certificate store.

14. The method as claimed in claim 13, wherein the certificate service stores the certificate or two or more certificates which are revoked and removed from the certificate store in at least one of (i) an archive of the control system and (ii) a cloud-based environment to enable traceability of certificate revocations.

15. The method as claimed in claim 13, wherein the certificate service is configured only to initiate the removal of the certificate upon receiving confirmation of the revocation of the certificate.

16. The method as claimed in claim 14, wherein the certificate service is configured only to initiate the removal of the certificate upon receiving confirmation of the revocation of the certificate.

17. The method as claimed in claim 13, wherein confirmation of the revocation of the certificate represents an explicit revocation message from a certification authority responsible for the revocation of the certificate.

18. The method as claimed in claim 13, wherein confirmation of the revocation of the certificate represents a revocation list issued by a certification authority responsible for revocation after the revocation of the certificate and which lists the revoked certificate and further certificates revoked by the certification authority.

19. The method as claimed in claim 13, wherein the certificate service initiates the revocation of at least one certificate by directly submitting a revocation request to a certification authority responsible for the revocation of certificates.

20. The method as claimed in claim 13, wherein the certificate service initiates the revocation of at least one certificate by a corresponding prompt to an operator of the control system.

21. The method as claimed in claim 18, wherein, in an event of the check identifying at least two certificates of this kind, or when an explicit revocation message from an certification authority responsible for the revocation exists, or when the revocation list issued after the revocation of the certificate exists, or upon revocation of the certificate, the certificate service classifies this event as a security event and stores a corresponding message in at least one of (i) an archive of the control system and (ii) a cloud-based environment.

22. The method as claimed in claim 13, wherein the technical installation comprises a process or manufacturing installation.

\* \* \* \* \*